(12) United States Patent
Nam

(10) Patent No.: US 10,410,438 B2
(45) Date of Patent: Sep. 10, 2019

(54) VEHICLE AND CONTROL METHOD OF VEHICLE

(71) Applicants: HYUNDAI MOTOR COMPANY, Seoul (KR); KIA MOTORS CORPORATION, Seoul (KR)

(72) Inventor: Bum Woo Nam, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 79 days.

(21) Appl. No.: 15/645,599

(22) Filed: Jul. 10, 2017

(65) Prior Publication Data
US 2018/0253912 A1 Sep. 6, 2018

(30) Foreign Application Priority Data
Mar. 3, 2017 (KR) .................. 10-2017-0027669

(51) Int. Cl.
| | |
|---|---|
| *B60W 30/18* | (2012.01) |
| *B60K 35/00* | (2006.01) |
| *G06F 7/58* | (2006.01) |
| *G07C 5/06* | (2006.01) |
| *G07C 5/08* | (2006.01) |

(52) U.S. Cl.
CPC .............. *G07C 5/06* (2013.01); *B60K 35/00* (2013.01); *B60W 30/18009* (2013.01); *G06F 7/582* (2013.01); *G07C 5/085* (2013.01); *B60K 2370/16* (2019.05); *B60K 2370/50* (2019.05)

(58) Field of Classification Search
CPC .... G07C 5/008; G07C 5/085; G07C 2205/02; G07C 5/06; G01C 22/02; H04L 2209/84; G06F 7/582; B60K 35/00; B60K 2350/1076; B60K 2350/35; B60W 30/18009
USPC .......... 701/22, 123, 533; 700/286; 705/7.35; 708/250; 235/376; 380/255; 455/41.2; 365/201; 340/571
See application file for complete search history.

(56) References Cited

U.S. PATENT DOCUMENTS

| | | | | |
|---|---|---|---|---|
| 2004/0064247 | A1* | 4/2004 | Davis ...................... | G07B 15/02 701/533 |
| 2005/0045713 | A1* | 3/2005 | Ko ......................... | G01C 22/02 235/376 |
| 2005/0190619 | A1* | 9/2005 | Wakiyama ............... | G11C 7/24 365/201 |
| 2006/0290495 | A1* | 12/2006 | Hughes .................. | G06Q 10/08 340/571 |

(Continued)

FOREIGN PATENT DOCUMENTS

| | | | |
|---|---|---|---|
| GB | 2326720 A | * | 12/1998 |
| JP | 2003-21536 A | | 1/2003 |

(Continued)

*Primary Examiner* — Anshul Sood
(74) *Attorney, Agent, or Firm* — Brinks Gilson & Lione (57) ABSTRACT

A vehicle may include: a cluster module to display a mileage; a plurality of electronic control units to store the mileage; and a controller to select at least one electronic control unit that stores the mileage, among the plurality of electronic control unit. It is difficult to know which electronic control unit stores mileage-related data, thereby inhibiting or preventing a mileage manipulation behavior performed while replacing a cluster and an electronic control unit.

16 Claims, 8 Drawing Sheets (56) References Cited

U.S. PATENT DOCUMENTS

| | | | | |
|---|---|---|---|---|
| 2008/0294707 | A1* | 11/2008 | Suzuki | B60R 25/042 |
| | | | | 708/250 |
| 2011/0022239 | A1* | 1/2011 | Forbes, Jr. | G06Q 10/00 |
| | | | | 700/286 |
| 2014/0073254 | A1* | 3/2014 | Ichihara | G07C 5/008 |
| | | | | 455/41.2 |
| 2014/0180565 | A1* | 6/2014 | Shiogai | B60L 11/18 |
| | | | | 701/123 |
| 2015/0120106 | A1* | 4/2015 | Yu | B60W 10/18 |
| | | | | 701/22 |
| 2015/0154818 | A1* | 6/2015 | Lee | G07C 5/08 |
| | | | | 380/255 |
| 2015/0332411 | A1 | 11/2015 | Bush et al. | |
| 2015/0379542 | A1* | 12/2015 | Lian | G06Q 30/0206 |
| | | | | 705/7.35 |
| 2016/0180612 | A1* | 6/2016 | Wittliff | G07C 5/008 |
| | | | | 701/123 |
| 2017/0365107 | A1* | 12/2017 | Jeong | G07C 5/008 |
| 2018/0089909 | A1* | 3/2018 | Abuelsaad | G07C 5/06 |
| 2018/0190043 | A1* | 7/2018 | Dominic | G07C 5/085 |

FOREIGN PATENT DOCUMENTS

| | | | |
|---|---|---|---|
| JP | 2005-53397 A | | 3/2005 |
| KR | 20100122670 A | * | 11/2010 |
| KR | 10-2015-0065003 | | 6/2015 |
| KR | 10-1557283 | | 10/2015 |

\* cited by examiner

VEHICLE AND CONTROL METHOD OF VEHICLE

CROSS-REFERENCE TO RELATED APPLICATION

This application claims priority to and the benefit of Korean Patent Application No. 10-2017-0027669, filed on Mar. 3, 2017, which is incorporated herein by reference in its entirety.

FIELD

Forms of the present disclosure relate to a vehicle and a control method of the vehicle to inhibit manipulation of a mileage

BACKGROUND

The statements in this section merely provide background information related to the present disclosure and may not constitute prior art.

A mileage is information that helps to understand a condition of a vehicle. Mileage is measured and accumulated while the vehicle is in operation after being manufactured. An accumulated mileage is displayed in a cluster, also known as a Gauge, so that the driver recognizes it.

Recently, a conventional mechanical odometer has been replaced with an electronic odometer, or a digital cluster (hereinafter referred to as a 'cluster'), in accordance with a trend of automotive electronic systems. The cluster is provided with a function to display not only the accumulated mileage data but also a warning lamp, a turn signal lamp, a speedometer, a tachometer, a fuel and a temperature gauge in various screen configurations on a liquid crystal display (LCD).

SUMMARY

The present disclosure provides a vehicle and a controlling method of the vehicle, which makes it difficult to know which electronic control unit stores a mileage-related data and inhibits a mileage manipulation behavior performed by replacing a cluster and an electronic control unit.

In one aspect of the present disclosure, a vehicle may include: a cluster module configured to display a mileage; a plurality of electronic control units configured to store the mileage; and a controller configured to select at least one electronic control unit that stores the mileage, among the plurality of electronic control unit.

The controller may generate a random number based on the number of the plurality of electronic control units and selects at least one electronic control unit that stores the mileage, among the plurality of electronic control unit, based on the random number.

The controller may store the mileage in at least one electronic control unit having a serial number matched with the random number, among the plurality of electronic control units.

The controller may transmit an authority message for storing the mileage to the selected electronic control unit.

The controller may comprise a communication gateway connecting the cluster module and the plurality of electronic control units The controller may perform a network configuration when the mileage is equal to or greater than a predetermined distance.

The cluster module may transmit the mileage to the selected at least one electronic control unit whenever the mileage increases.

The controller may compare the mileage stored in the selected at least one electronic control unit with the mileage displayed on the cluster module.

The vehicle may further include a vehicle interface configured to output a warning for a manipulation of the mileage. In particular, the controller is configured to control the vehicle interface and the cluster module to output the warning when a difference between the mileage stored in the selected at least one electronic control unit and the mileage displayed on the cluster module exceeds a predetermined error range.

The controller may generate a Dynamic Traction Control (DTC) when a difference between the mileage stored in the selected at least one electronic control unit and the mileage displayed on the cluster module exceeds the predetermined error range.

The controller may control the selected at least one of electronic control unit to transmit the stored mileage when a start command is changed from OFF to ON.

When the serial number of the plurality of electronic control units does not match the random number, the controller may generate the random number again.

The controller may select the at least one electronic control unit at least once.

In another aspect of the present disclosure, a control method of a vehicle may include steps of: displaying, by a cluster module, a mileage; selecting, by a controller, at least one electronic control unit configured to store the mileage, among the plurality of electronic control unit; storing the mileage by the selected at least one electronic control unit.

The selecting step may include: generating a random number based on the number of the plurality of electronic control units; and selecting at least one electronic control unit that stores the mileage, among the plurality of electronic control unit, based on the random number.

The selecting step may include selecting the at least one electronic control unit having a serial number matched with the random number, among the plurality of electronic control units.

The method may further include comparing the mileage stored in the selected at least one electronic control unit with the displayed mileage.

The method may further include warning a manipulation of the mileage when a difference between the mileage stored in the selected at least one electronic control unit with the displayed mileage exceeds a predetermined error range.

The storing step may include receiving and storing the mileage through an electronic control unit operating as a gateway in a communication network of the vehicle.

The storing step may include storing the mileage by the selected at least one electronic control unit when the mileage is increased by a predetermined distance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Not all elements of forms of the present disclosure will be described, and description of what are commonly known in the art or what overlap each other in the forms will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and forms of the present disclosure will now be described with reference to accompanying drawings.

Figure 1:
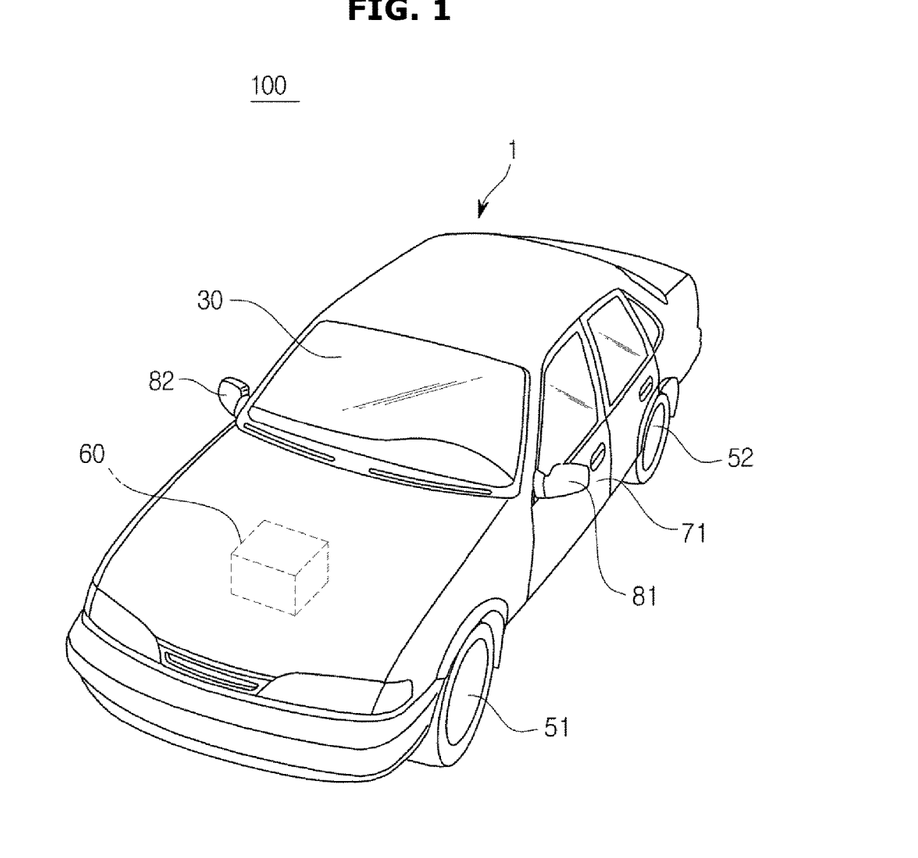
FIG. 1 is a view illustrating an appearance of a vehicle.

FIG. 1 is a view illustrating an appearance of a vehicle in one form of the present disclosure.

Referring to FIG. 1, a vehicle 100 includes: a main body 1 forming the appearance of the vehicle 100; vehicle wheels 51, and 52 to move the vehicle 100 from place to place; a driver 60 to rotate the vehicle wheels 51, 52; doors 71 and, 72 (referring to FIG. 4) to shield an indoor space of the vehicle 100 from the outside; a vehicle windshield 30 to provide a forward view of the vehicle 100 to a vehicle driver who rides in the vehicle; and side-view mirrors 81, and 82 to provide a rear view of the vehicle 100 to the vehicle driver.

The wheels 51, 52 may include front wheels 51 provided at the front of the vehicle 100 and rear wheels 52 provided at the rear of the vehicle 100. The driver 60 may provide rotational force to the front wheels 51 or the rear wheels 52 so that the main body 1 moves forward or backward. The driver 60 may include an engine to generate rotational force by burning fossil fuels or a motor to generate rotational force upon receiving electric power from a condenser (not shown)

The doors 71 and 72 are provided on the right and left sides of the main body 1 so that a vehicle driver rides in the vehicle 100 when any of the doors 71 and 72 is open and an indoor space of the vehicle 100 may be shielded from the outside when the doors 71 and 72 are closed.

The windshield 30 is provided at a front upper portion of the main body 1 so that a vehicle driver who rides in the vehicle may see a forward direction of the vehicle 100. The side-view mirrors 81, 82 may include a left side-view mirror 81 provided at the left of the main body 1 and a right side-view mirror 82 provided at the right of the main body 1, so that the driver who rides in the vehicle 100 may see the lateral and rear directions of the vehicle 100 through the side-view mirrors 81, 82.

In addition, the vehicle 100 may include sensing devices, such as a proximity sensor for detecting an obstruction or other cars behind the vehicle 100, a rain sensor for detecting precipitation and whether it is raining, an antenna that performs wireless communication externally, etc.

The vehicle 100 operates under a control of various electronic control units (ECUs) provided in the vehicle 100. The various electronic control units may control various configurations provided in not only the appearance of the vehicle 100 but also the inside of the vehicle 100.

Figure 2:
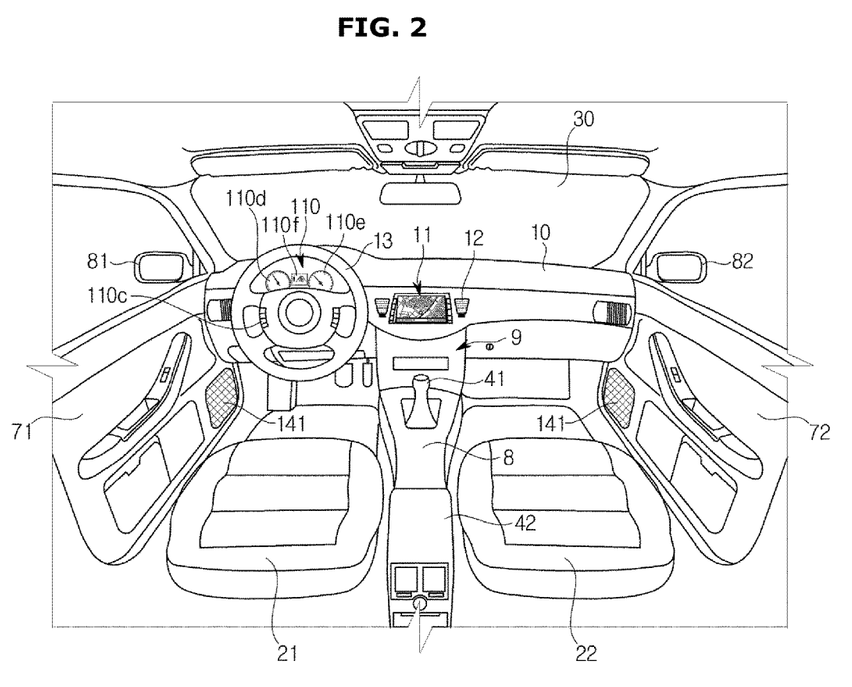
FIG. 2 is a view illustrating an internal structure of a vehicle.

FIG. 2 is a view illustrating an internal structure of a vehicle in one form of the present disclosure.

Referring to FIG. 2, a vehicle 100 may have a dashboard 10 that includes a gearbox 8, a center console (also called a center fascia) 9, a steering wheel 13, etc.

The gearbox 8 is located between a driver's seat 21 and an assistant seat 22 provided inside the vehicle 100. A gearshift 41 for changing gears may be installed at the gearbox 8. In addition, as illustrated in FIG. 2, not only an audio video navigation (AVN) module 11 but also an operator (not shown) for allowing a user to control the principal functions of the vehicle may be installed at the gearbox 8.4.

The center fascia 9 may be provided with a ventilation hole connected to an air conditioner and various output devices connected to the AVN module 11. The air conditioner controls the temperature, humidity, air cleanliness and air flow inside the vehicle 100 to keep the inside of the vehicle 100 comfortable. The air conditioner may include at least one discharge port 12 installed in the center fascia 9 for discharging air.

The AVN module 11 means a terminal capable of providing a navigation function for providing a path to a destination to a user, as well as providing audio and video functions integrally.

The AVN module 11 outputs an image through a display as shown in FIG. 2 In addition, the AVN terminal 11 may output a sound through a speaker 141 shown in FIG. 2

Meanwhile, an input for receiving an input command for controlling the AVN module 11 may be provided around the display, and a passenger inside the vehicle 100 may control the AVN module 11 through the input described above. However, the input is not necessarily required to be provided only around the display, and may be provided on the operator provided on the gearbox 8 or on the steering wheel 13.

The cluster module 110 is provided on an area of the dashboard 10 facing the steering wheel 13 to allow the driver to check a gauge while driving, and a cluster display 110b may also be implemented as a (Liquid Crystal Display (LCD), a (Light Emitting Diode (LED), a (Plasma Display Panel (PDP), an (Organic Light Emitting Diode (OLED), a (Cathode Ray Tube (CRT), etc.

A cluster input 110c may be provided on an area of the steering wheel 13 in the form of hard keys so as to be manipulated by the driver while grasping the steering wheel 13. Alternatively, the cluster input 110c may be provided behind the steering wheel 13 in the form of a lever such that the user may control the cluster module 110 by pushing the lever forward, backward, upward, or downward.

The cluster module 110 includes a cluster display 110b. The cluster display 110b may further include a speed gauge 110d to indicate the speed of the vehicle 100, a revolutions per minute (RPM) gauge 110e to indicate RPM of the vehicle 100, and a mileage gauge 110f to indicate the fuel amount or mileage of the vehicle 100. A detailed description related to this will be given later with reference to FIG. 3.

Meanwhile, an interior of the vehicle 100 may include various configurations controlled by an electronic control unit in addition to the above-described configuration. The cluster display 110b that displays the mileage will be described in detail with reference to FIG. 3.

Figure 3:
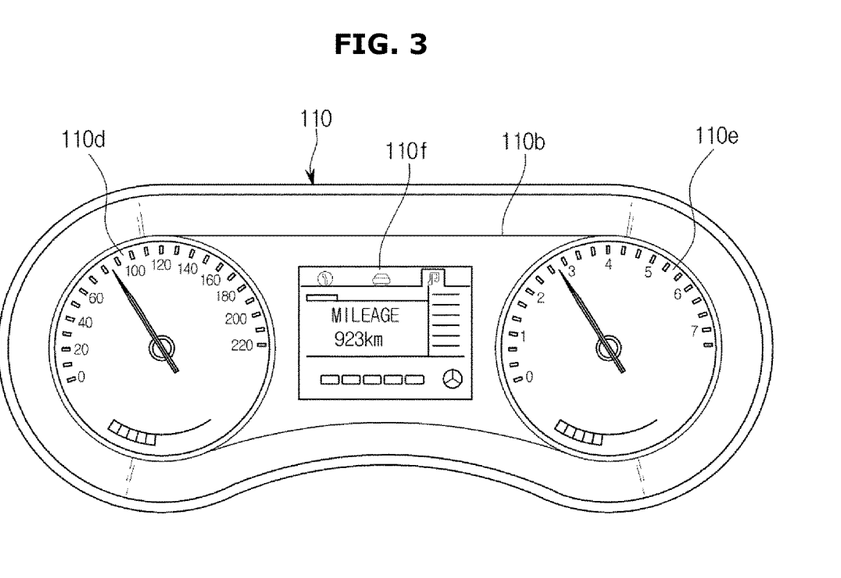
FIG. 3 is a diagram illustrating an example in which mileage is displayed on a cluster display.

FIG. 3 is a diagram illustrating an example in which mileage is displayed on a cluster display.

Referring to FIG. 3 the cluster display 110b may include the speed gauge 110d that represents a speed of a vehicle 100, the Revolution Per Minute (RPM) gauge 110e that represents a RPM of the vehicle 100, and the mileage gauge 110f that represents a fuel amount or mileage of the vehicle 100.

The speed gauge 110d indicates a rotational speed of wheels 51 and, 52 when an ignition of the vehicle 100 is switched to ON state and a driver operates an accelerator pedal.

The RPM gauge 110e indicates the number of revolutions per minute of a motor that is turned on by a driver 60 when an ignition of the vehicle 100 is switched to ON state.

The mileage gauge 110f indicates a cumulative mileage at which the vehicle 100 has moved due to the rotation of the wheels 51, and 52. The mileage refers to a distance traveled by the vehicle 100 after the vehicle 100 is shipped from a manufacturer.

This mileage is an important factor in determining the price of a vehicle 100 in the used car market. For this reason, in the used car market, many illegal attempts to manipulate the mileage of the vehicle 100 occur. This attempt is mainly made by manipulating the cluster display 110b in which the mileage is displayed. In order to manipulate the cluster display 110b, a processor of the cluster module 110 is hacked or the cluster module 110 is replaced itself.

In order to inhibit or prevent this manipulation, a conventional vehicle encrypts the mileage in the cluster module 110 and stores the encrypted data in an interface control unit (ICU), which acts as a gateway on a network of the cluster module 110 and electronic control units in the conventional vehicle.

However, there is a risk of manipulating the mileage when the cluster module 110 and the ICU are exchanged together. Hereinafter, the vehicle 100 and a controlling method of the vehicle 100 for preventing a manipulation of a mileage will be introduced.

Meanwhile, the mileage gauge 110f may output the cumulative mileage and also display running information such as a mileage or a running time from a reset time to the present, a mileage according to a present fuel amount and an average fuel efficiency according to a fuel consumption amount. The mileage gauge 110f is not limited to above description.

Figure 4:
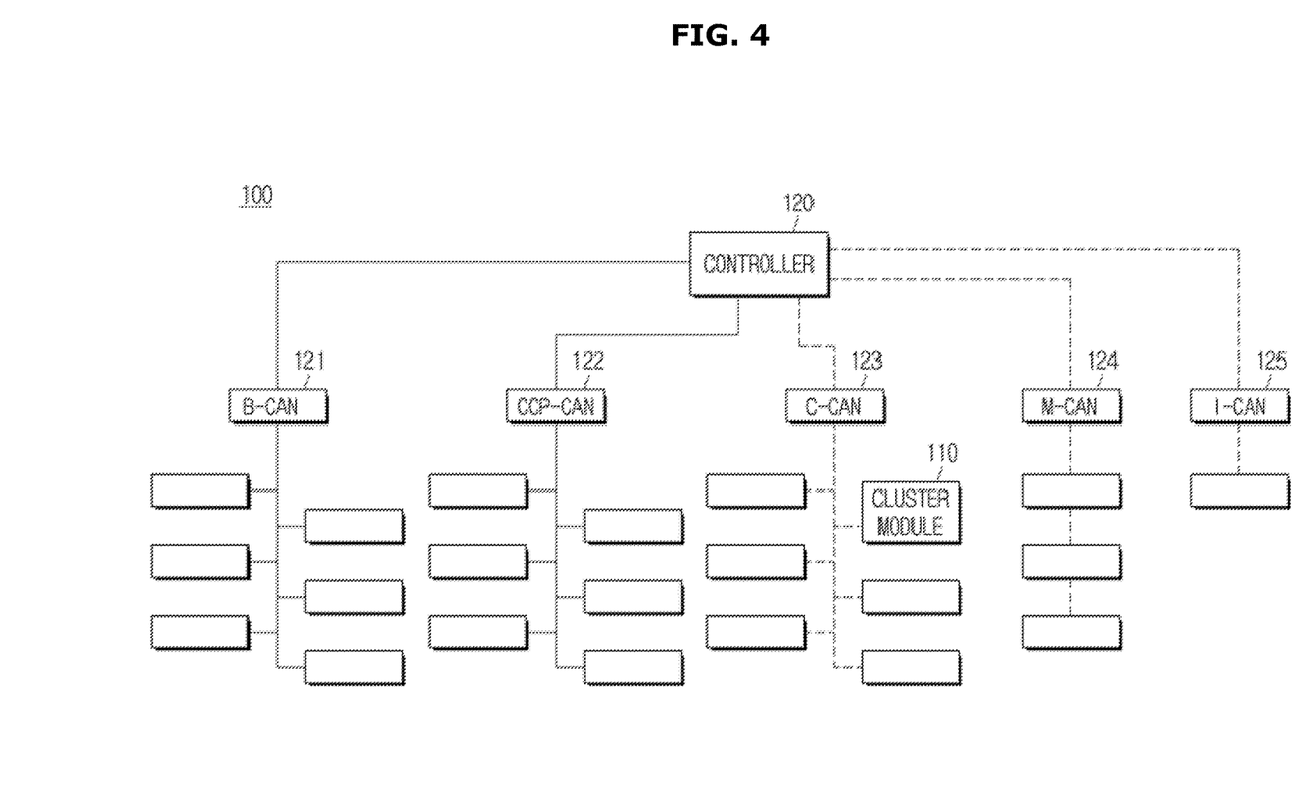
FIG. 4 is a schematic diagram for explaining a communication network of a vehicle.

FIG. 4 is a schematic diagram for explaining a communication network of a vehicle in one form of the present disclosure.

The vehicle 100 includes a communication network connecting a various electronic control units together as shown in FIG. 4. The communication network mainly used in the vehicle 100 uses a control area network (CAN) bus as a communication protocol.

These CAN buses may be further divided into different class categories such as B-CAN 121, CCP-CAN 122, C-CAN 123, M-CAN 124 and I-CAN 125. And these classes are classified according to a size and speed of a data exchanged by a connected electronic control unit.

For example, electronic control units that are responsible for convenience functions such as electronic boot releases, sunroofs, and electric mirror adjusters may be classified as classes that operate at less than 10 Kbit/s. Electronic control units that are responsible for real time functions such as powertrain, stability control (ABS, traction control, and active suspension), engine management, and shifting may be classified as classes operating at 125 Kbit/s to 1 Mbit/s.

The communication network in the vehicle 100 requires a gateway for exchanging data between various electronic control units on a bus. As shown in FIG. 4, the vehicle 100 may achieve a centralized architecture in which a controller 120, which acts as a gateway, mediates various electronic control units.

As described in FIG. 3, even if the controller 120 serving as a gateway and a cluster module 110 encrypt and store a mileage data of the vehicle 100, the mileage may be easily manipulated when the cluster module 110 and the controller 120 are replaced.

In order to inhibit or prevent such a manipulation, the vehicle 100 may be configured such that the controller 120 serving as a gateway selects an arbitrary electronic control unit among various electronic control devices shown in FIG. 4, and controls the selected electronic control unit so that the selected electronic control unit stores the mileage stored in the cluster module 110.

Meanwhile the network topology shown in FIG. 4 is merely an example for describing the network of the vehicle 100 disclosed. For example, the controller 120 serving as a gateway does not necessarily have to be a single terminal but may be provided for each class. In addition, it is not necessary that the various electronic control units provided in the disclosed vehicle 100 are limited to the number shown in FIG. 4.

Figure 5:
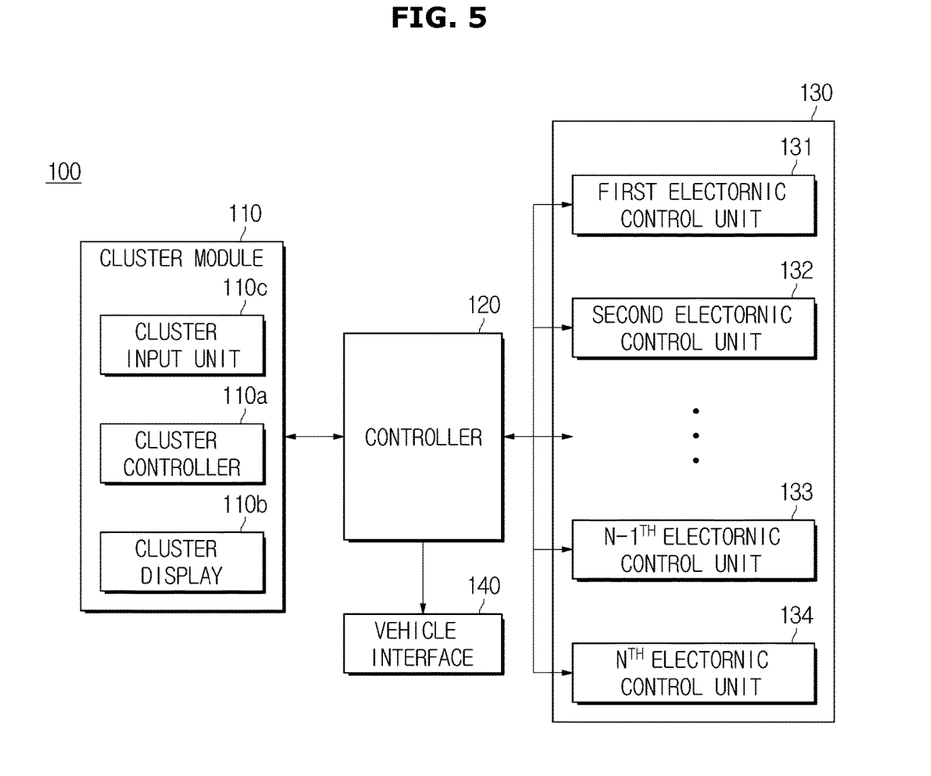
FIG. 5 is a control block diagram of a vehicle.

FIG. 5 is a control block diagram of a vehicle in one form of the present disclosure.

Referring to FIG. 5, the vehicle 100 includes the cluster module 110 for displaying a mileage and the like, the controller 120 for selecting an electronic control unit to store mileage-related data transmitted from the cluster module 110, a plurality of electronic control units 130 provided in the vehicle 100 and a vehicle interface 140 for outputting an alarm sound or the like when there is an attempt to manipulate a mileage.

Particularly, the cluster module 110 may include the cluster input 110c that receives a user's input command, a cluster controller 110a that controls the overall operation of the cluster module 110 and the cluster display 110b that displays the mileage or the like under the control of the cluster controller 110a. A description of the same parts as those shown in in FIGS. 3 and 4, will be omitted.

The cluster controller 110a is a processor that controls the overall operation of the cluster module 110. For example, in response to a user's input command, the cluster controller 110a may control the cluster display 110b, receive signals transmitted by other electronic control units 130 of the vehicle 100, and control the cluster display 110b in response to the signals.

The cluster controller 110a may calculate a cumulative mileage by calculating the number of pulses transmitted from a vehicle speed sensor provided in the vehicle 100.

The vehicle speed sensor may include a reed switch type vehicle speed sensor mounted near the rotating magnet in the speed meter of the vehicle 100 and detecting the vehicle speed by an ON or OFF signal, a photocoupler that combines a light emitting diodes in the speed meter and phototransistors, a photoelectric type vehicle speed sensor that detects a vehicle speed by a shading plate (blades) driven by a speed meter cable and an electronic vehicle speed sensor that is mounted on a transmission and detects a vehicle speed by a change in magnetic flux that is varied by rotation of a gear.

The cluster controller 110a stores a calculated mileage and transmits the calculated mileage to the controller 120.

The electronic control unit 130 shown in FIG. 5 means various electronic control units 131 to 134 that may be provided in the vehicle 100. The electronic control unit 130 includes a plurality of electronic control units, and may exchange data with each other through a communication network in the vehicle 100.

A selected electronic control unit 130 may receive a mileage transmitted from the cluster controller 110a through the controller 120 and store the mileage.

In addition, the selected electronic control unit 130 may transmit the mileage stored by the signal of the controller 120 to the controller 120 again.

The vehicle interface 140 includes all of various interface devices in the vehicle 100 except for the cluster module 110. For example, the vehicle interface 140 may include the AVN module 11 or the Head Up Display (HUD) module described in FIG. 2.

The vehicle interface 140 may output a determination result related to a manipulation of a mileage under a control of the controller 120. For example, the controller 120 compares a mileage transmitted from the selected electronic control unit 130 with a mileage transmitted from the cluster module 110, and then determines that the mileage of the cluster module 110 has been manipulated. At this time, the vehicle interface 140 may output a voice message 'Confirm cluster mileage' through the speaker 141 based on the control of the controller 120, and the AVN module 11 may display a warning image on the display.

The controller 120 means an electronic control unit acting as a gateway in a network in the vehicle 100 described above with reference to FIG. 4. The controller 120 may determine which electronic control unit 130 stores a mileage transmitted from the cluster module 110 and determines whether the cluster module 110 has been manipulated. A detailed description thereof will hereinafter be described with reference to FIGS. 6 to 8.

The controller 120 may be implemented with a memory (not shown) for storing data for a program reproducing an algorithm or the algorithm for controlling an operation of the configuration and a processor (not shown) that performs above described operations using the data stored in a memory. The memory may be implemented as a separate chip independent of the processor, or may be implemented as a processor and a single chip.

Meanwhile, the cluster module 110, the controller 120 and the electronic control unit 130 may be implemented in at least one type of flash memory, hard disk, multimedia card micro type memory, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The cluster module 110, the controller 120, and the electronic control unit 130 all include non-volatile storage media, and may store the mileage data and algorithms desired for the operation.

At least one component may be added or deleted corresponding to the performance of the configuration shown in FIG. 5. It will be readily understood by those skilled in the art that the mutual position of the components may be changed corresponding to the performance or structure of the system. Each of the components shown in FIG. 5 refers to a software and/or hardware component such as a Field Programmable Gate Array (FPGA) and an Application Specific Integrated Circuit (ASIC).

Figure 6:
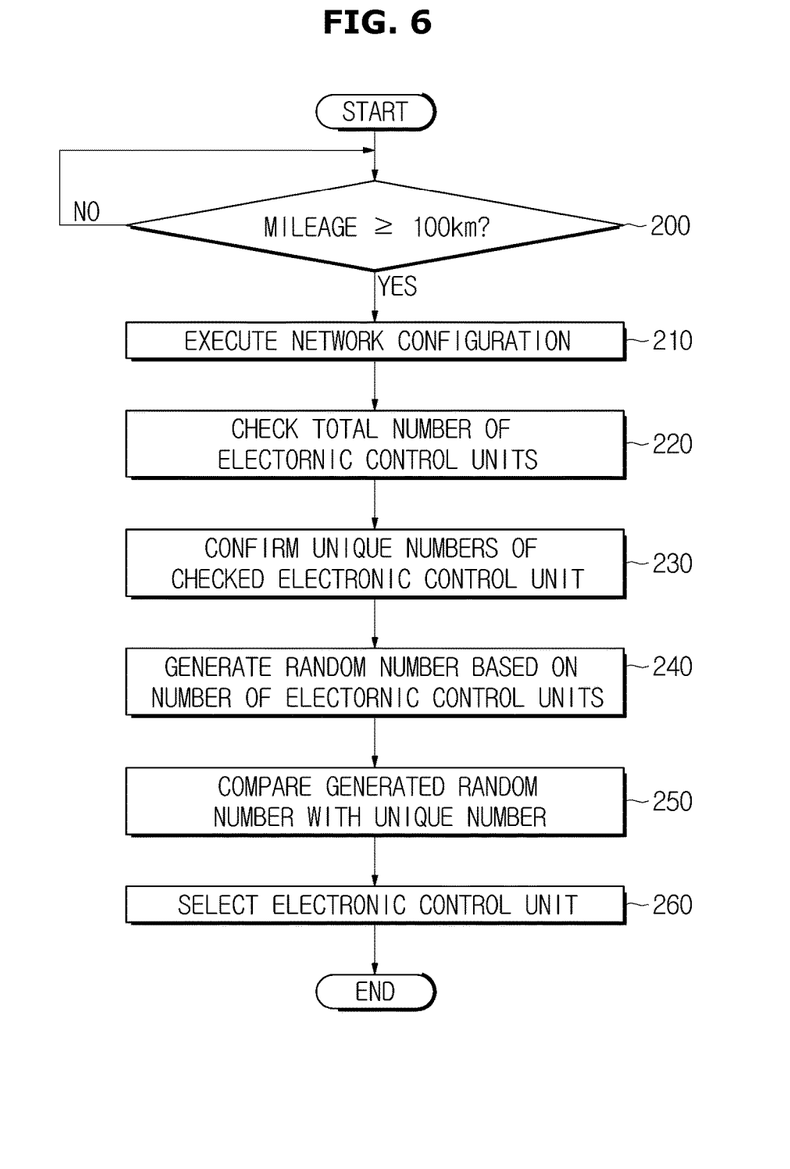
FIG. 6 is a flowchart showing a method of selecting an electronic control unit in which a vehicle stores a mileage.

FIG. 6 is a flowchart showing a method of selecting an electronic control unit in which a vehicle stores a mileage in one form of the present disclosure.

Referring to FIG. 6, the controller 120 determines whether a cumulative mileage of the vehicle 100 is 100 km or more (200).

Generally, the vehicle 100 undergoes a basic driving test after its initial assembly. The controller 120 determines that the vehicle 100 is delivered to a user when a cumulative mileage is greater than or equal to 100 km, and selects an electronic control unit 130 to store the mileage accumulated by the driver.

Here, 100 km is a predetermined distance, and may be variously changed as desired.

When the cumulative mileage of the vehicle 100 is less than a predetermined distance, the controller 120 determines that the vehicle 100 is assembled by the manufacturer and is in a basic running test.

However, when the cumulative mileage of the vehicle 100 is equal to or greater than the predetermined distance, the controller 120 performs the following operations The controller 120 executes network configuration (210).

Network configuration refers to a process of verifying that various electronic control units 130 connected through a communication network in the vehicle 100 are actually connected. That is, the controller 120 as a communication gateway analyzes a signal that the connected electronic control units 130 respond.

When the electronic control units 130 transmits a response signal in response to a request signal transmitted from the controller 120, the controller 120 checks a total number of the electronic control units 130 connected to the controller 120 based on the response signal (220).

The various electronic control units 131 to 134 described in FIG. 5 refer to electronic control units identified by network configuration. That is, the identified electronic control units 130 include N pieces from a first electronic control unit 131 to a Nth electronic control unit 134.

Thereafter, the controller 120 confirms unique numbers of the checked electronic control unit 130 (230).

The unique number is an order number of the electronic control units 130 set at a manufacturing stage of the vehicle 100 and may be stored in each electronic control unit or separately stored in the controller 120.

For example, an Airbag Control Unit (ACU) for controlling an airbag provided in the vehicle 100 may have a unique sequence number of 1, and an Electronic Stability Control (ESC), which is controlling an attitude control device of a main body 1, may have a unique sequence number of 2.

The unique number may be variously modified and is not limited thereto.

The controller 120 generates a random number from 1 to N using a stored internal function (240).

Here, the random number means a set of randomly arranged numbers without repeating a certain cycle and without a specific rule.

After generating the random number, the controller 120 compares the generated random number with the unique number (250).

The controller 120 selects an electronic control unit 130 whose unique number matches the random number generated according to the comparison result (260).

The controller 120 gives the authority to store a mileage to the electronic control unit 130 having the unique number matched with the generated random number. Particularly, the controller 120 transmits a message related to the authority to the selected electronic control unit 130. The selected electronic control unit 130 receives the message. And the selected electronic control unit 130 receives and stores the mileage transmitted by the cluster module 110 through a communication network in the vehicle 100 by presenting the message related authority before receiving the mileage data to be transmitted thereafter.

When there is no a matching electronic control unit 130, the controller 120 may generate a new random number again to select the electronic control unit 130 corresponding to the unique number.

This makes it possible to prevent the outside of the vehicle 100 from knowing an arbitrarily electronic control unit selected by the controller 120 and to inhibit or prevent the mileage from being manipulated by replacing a cluster.

Meanwhile, the operation described in FIG. 6 may be operated only once at a beginning when a mileage exceeds a predetermined distance. However, the present disclosure is not limited thereto, and may include various modifications.

Figure 7:
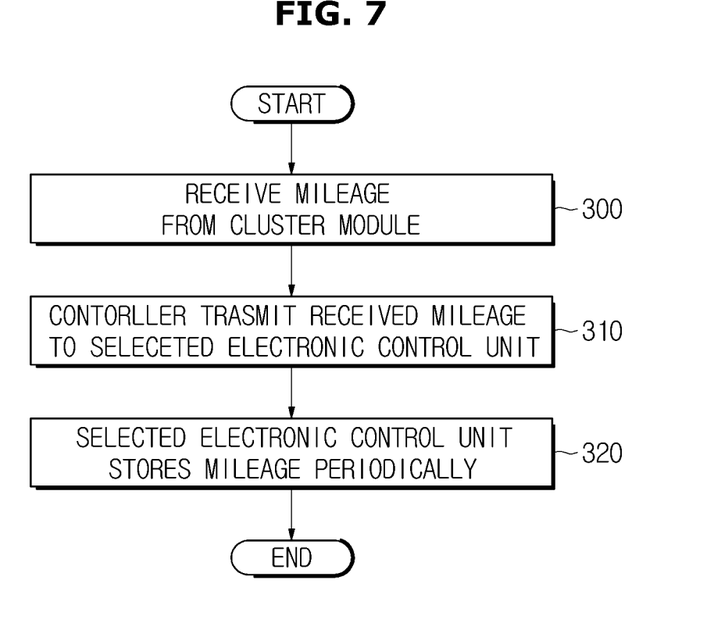
FIG. 7 is a flowchart showing an operation of a vehicle, after selecting an electronic control unit for storing a mileage.

FIG. 7 is a flowchart showing an operation of a vehicle, after selecting an electronic control unit for storing a mileage.

Referring to FIG. 7, the cluster module 110 generates a mileage and transmits the mileage to the selected electronic control unit 130 through a communication network in-vehicle 100 (300).

The controller 120 transmits an authorization message to store the mileage to the selected electronic control unit 130.

The communication network in the vehicle 100 has information of a destination and transmits the mileage (310).

The mileage transmitted by the cluster module 110 reaches the arbitrary electronic control unit 130 having the authority message through the controller 120, and the arbitrary electronic control unit 130 stores the mileage.

An arbitrary electronic control unit 130 selected by the controller 120 periodically exchanges a mileage with the cluster module 120 and stores the mileage in a cumulative manner (320).

The arbitrary electronic control unit 130 receives the mileage transmitted through the controller 120, and may store a cumulative mileage on a storage medium, e.g., the ROM, included in the arbitrary electronic control unit 130 every time the mileage increases by 1 km. Here, 1 km is a predetermined value, and may be variously changed.

Figure 8:
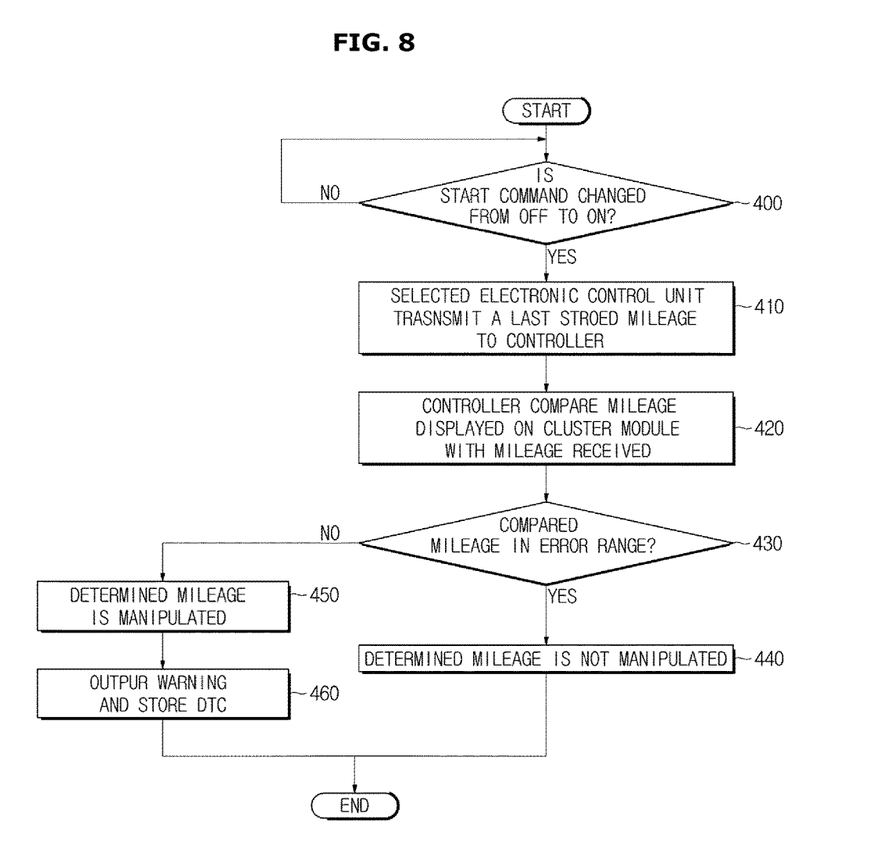
FIG. 8 is a flowchart showing a method for inhibiting a manipulation of a mileage.

FIG. 8 is a flowchart showing a method for inhibiting a manipulation of a mileage in one form of the present disclosure.

Referring to FIG. 8, the controller 120 detects whether a start command is changed from OFF to ON (400).

Here, the start command means ignition of the driver 60 of the vehicle 100, and when the start command is changed from OFF to ON, the controller 120 determines that the vehicle 100 runs soon and a mileage will be accumulated.

When in the opposite condition, that is, the start command changes from ON to OFF, the controller 120 determines that the mileage is not accumulated and the controller 120 waits for the case of step 400.

When the start command changes from OFF to ON, the controller 120 controls the electronic control unit 130 selected in FIG. 6, to transmit a last stored mileage to the controller 120 (410).

Particularly, the controller 120 receives a signal transmitted from an electronic control unit associated with the start command, and transmits a signal requesting a mileage to the selected electronic control unit 130 through a network in the vehicle 100. In response to the signal, the electronic control unit 130 transmits the mileage lastly stored in the storage medium of the electronic control unit 130 to the controller 120.

The controller 120 receives the mileage, and compares a mileage displayed on the cluster module 110 with the mileage received (420).

Particularly, the controller 120 receives a data related to a mileage to be displayed through the cluster controller 110a among the cluster modules 110. And the controller 120 compares the data with the stored mileage to determine whether a difference between the mileage displayed in the cluster module 110 and the mileage stored in the selected electronic control unit 130 is within an error range (430).

As a result of the comparison, when a difference between the mileage displayed in the cluster module 110 and the mileage stored in the selected electronic control unit 130 is within the error range, the controller 120 determines that the mileage is not manipulated (440).

Here, the error range is a predetermined value and may be set to various values.

When the difference between the mileage displayed in the cluster module 110 and the mileage stored in the selected electronic control device 130 exceeds the error range, the controller 120 determines that there is a manipulation of mileage displayed on the cluster module 110 (450).

In this case, the controller 120 controls the cluster module 110 and the vehicle interface 140 to output a warning sound or warning image indicating that there is a manipulation of mileage (460).

For example, the controller 120 transmits a signal to the cluster controller 110a through the network in the vehicle 100, and the cluster controller 110a continuously pop-up a warning message through the cluster display 110b. The cluster display 110b may display a warning message saying "Please confirm a cluster mileage" or icon associated therewith.

The controller 120 may also generate a Dynamic Traction Control (DTC) related to the cluster module 110 when it is determined that the mileage is manipulated. The generated DTC is displayed through a diagnostic unit during maintenance of the vehicle 100, and the cluster module 110 may warn that the mileage is displayed incorrectly by an external manipulation.

The vehicle and the controlling method of the vehicle inhibit or prevent a hacking method capable of manipulating the mileage by replacing the cluster module and the ICU, and prevent the outside of the vehicle 100 from knowing which electronic control unit stores the mileage. Therefore, an electronic control unit that stores the mileage may vary in the same model of the vehicle 100 and thus it is not needed to apply a conventional encryption technology, which helps to reduce a price of vehicles.

Although a few forms of the present disclosure have been shown and described, it would be appreciated by those skilled in the art that changes may be made in these forms without departing from the principles and spirit of the present disclosure.

What is claimed is:

1. A vehicle comprising;
a cluster module configured to display a mileage;
a plurality of electronic control units configured to store the mileage; and
a controller configured to select at least one electronic control unit of the plurality of electronic control units that stores the mileage,
wherein the controller is configured to generate a random number based on a number of electronic units of the plurality of electronic control units and to store the mileage in at least one electronic control unit of the plurality of electronic control units having a serial number that matches the random number.

2. The vehicle according to claim 1, wherein
when the serial numbers of the electronic control units of the plurality of electronic control units do not match the random number, the controller is configured to generate the random number again.

3. The vehicle according to claim 1, wherein
the controller is configured to transmit an authority message for storing the mileage to the selected electronic control unit.

4. The vehicle according to claim 1, wherein
the controller comprises a communication gateway connecting the cluster module and the plurality of electronic control units.

5. The vehicle according to claim 1, wherein
the controller is configured to perform a network configuration when the mileage is equal to or greater than a predetermined distance.

6. The vehicle according to claim 1, wherein
the cluster module is configured to transmit the mileage to the selected at least one electronic control unit whenever the mileage increases.

7. The vehicle according to claim 6, wherein
the controller is configured to control the selected at least one of electronic control unit and transmit the stored mileage when a start command is changed from OFF to ON.

8. The vehicle according to claim 1, wherein
the controller is configured to compare the mileage stored in the selected at least one electronic control unit with the mileage displayed on the cluster module.

9. The vehicle according to claim 8, further comprising:
a vehicle interface configured to output a warning for a manipulation of the mileage;
wherein the controller is configured to control the vehicle interface and the cluster module and to output the warning when a difference between the mileage stored in the selected at least one electronic control unit and the mileage displayed on the cluster module exceeds a predetermined error range.

10. The vehicle according to claim 8, wherein
the controller is configured to generate a Dynamic Traction Control (DTC) when a difference between the mileage stored in the selected at least one electronic control unit and the mileage displayed on the cluster module exceeds a predetermined error range.

11. The vehicle according to claim 1, wherein
the controller is configured to select the at least one electronic control unit at least once.

12. A control method of a vehicle, comprising steps of:
displaying, with a cluster module, a mileage;
selecting, by a controller, at least one electronic control unit from a plurality of electronic control units that is configured to store the mileage;
storing, with the controller, the mileage in the selected at least one electronic control unit,
wherein the selecting step comprises generating a random number based on a number of electronic control units that comprise the plurality of electronic control units, and selecting the at least one electronic control unit from the plurality of electronic control units that has a serial number that matches the random number.

13. The method according to claim 12, further comprising;
comparing the mileage stored in the selected at least one electronic control unit with the displayed mileage.

14. The method according to claim 13, further comprising;
warning of a manipulation of the mileage when a difference between the mileage stored in the selected at least one electronic control unit with the displayed mileage exceeds a predetermined error range.

15. The method according to claim 12, wherein
the storing step comprises receiving and storing the mileage through an electronic control unit operating as a gateway in a communication network of the vehicle.

16. The method according to claim 12, wherein
the storing step comprises storing the mileage by the selected at least one electronic control unit when the mileage is increased by a predetermined distance.

* * * * *